United States Patent

Newman et al.

(10) Patent No.: US 9,578,054 B1
(45) Date of Patent: Feb. 21, 2017

(54) HACKING-RESISTANT COMPUTER DESIGN

(71) Applicants: Frank N. Newman, New York, NY (US); Dan Newman, Berkeley, CA (US)

(72) Inventors: Frank N. Newman, New York, NY (US); Dan Newman, Berkeley, CA (US)

(73) Assignee: Newman H-R Computer Design, LLC, New York, NY (US)

( * ) Notice: Subject to any disclaimer, the term of this patent is extended or adjusted under 35 U.S.C. 154(b) by 0 days.

(21) Appl. No.: 14/841,469

(22) Filed: Aug. 31, 2015

(51) Int. Cl.
*H04L 29/06* (2006.01)

(52) U.S. Cl.
CPC ............. *H04L 63/145* (2013.01); *H04L 63/10* (2013.01)

(58) Field of Classification Search
CPC ................................ H04L 63/145; H04L 63/10
See application file for complete search history.

(56) References Cited

U.S. PATENT DOCUMENTS

| | | | | |
|---|---|---|---|---|
| 4,991,079 A * | 2/1991 | Dann | ...................... | G06T 15/005 709/201 |
| 6,507,904 B1 * | 1/2003 | Ellison | ...................... | G06F 21/53 711/152 |
| 6,725,317 B1 * | 4/2004 | Bouchier | .............. | G06F 15/177 709/220 |
| 7,657,941 B1 | 2/2010 | Zaitsev | | |
| 8,082,585 B1 | 12/2011 | Givonetti | | |
| 8,381,297 B2 | 2/2013 | Touboul | | |
| 8,639,871 B2 * | 1/2014 | Borchers | ............... | G06F 3/0613 711/103 |
| 2003/0140069 A1 * | 7/2003 | Bobak | ................. | G06F 11/1441 |
| 2003/0140238 A1 * | 7/2003 | Turkboylari | .......... | G06F 21/575 713/193 |
| 2004/0044906 A1 * | 3/2004 | England | .................. | G06F 21/53 726/18 |
| 2004/0177342 A1 | 9/2004 | Worley, Jr. | | |
| 2005/0259484 A1 * | 11/2005 | Newell | ............... | G06F 12/1433 365/195 |
| 2006/0015749 A1 | 1/2006 | Mittal | | |
| 2006/0059345 A1 * | 3/2006 | Fayad | ..................... | G06F 21/72 713/173 |

(Continued)

OTHER PUBLICATIONS

Yoggie Internet Security Systems at CES 2009, https://www.youtube.com/watch?v=GF2NIso4EAY (Jan. 15, 2009).

*Primary Examiner* — Matthew Smithers
*Assistant Examiner* — Mary Li
(74) *Attorney, Agent, or Firm* — Bakos & Kritzer

(57) ABSTRACT

A computer architecture is disclosed for implementing a hacking-resistant computing device. The computing device, which could be a mainframe computer, personal computer, smartphone, or any other computing device suitable for network communication, comprises a first partition and a second partition. The second partition can communicate over a network such as the Internet. In contrast, the first partition cannot connect to the Internet, and can directly communicate only with the second partition through a bus or with input/output devices directly connected to the first partition. Further, the first partition segments its memory addressing between computer executable code, critical data files, and data files read from the second partition. The second partition is hardware-limited from reading or writing to the memory addressing of the first partition. As a result, the critical data files and program code stored on the first partition are protected from malicious code affecting the second partition.

20 Claims, 6 Drawing Sheets

(56) References Cited

U.S. PATENT DOCUMENTS

| | | | |
|---|---|---|---|
| 2009/0320048 A1* | 12/2009 | Watt | G06F 9/526 |
| | | | 719/319 |
| 2009/0327643 A1* | 12/2009 | Goodman | G06F 12/0646 |
| | | | 711/173 |
| 2010/0306848 A1 | 12/2010 | Gellerich | |
| 2012/0240230 A1* | 9/2012 | Lee | G06F 21/564 |
| | | | 726/24 |
| 2012/0271985 A1* | 10/2012 | Jeong | G06F 12/0238 |
| | | | 711/103 |
| 2014/0090046 A1 | 3/2014 | Touboul | |
| 2014/0115283 A1 | 4/2014 | Radovic et al. | |

* cited by examiner

HACKING-RESISTANT COMPUTER DESIGN

TECHNICAL FIELD

A computer architecture is disclosed for implementing a hacking-resistant computing device.

BACKGROUND OF THE INVENTION

A common method to infiltrate a computer is by placing malicious computer executable code (malware) into a computer through the Internet or other network connection. Such hacking has become a major threat, and major instances of hacking have been widely reported. The widely prevalent approaches to thwarting such hacking rely on software to identify and disable or remove the malware. However, hackers are becoming increasingly sophisticated, and the customary protections are not sufficient.

Therefore, there is a need in the art for a hacking-resistant computer system architecture utilizing a hardware approach. Such a hardware approach would be available to various computers for various applications. For example, a bank, company, government agency, or individual using the hardware approach disclosed in the present invention will be substantially more protected against hackers who might attempt to take control of their computers to steal or corrupt confidential data, personal information, or passwords stored on the computer. The hardware approach disclosed herein protects against hackers to an extent not possible with current software-based solutions.

SUMMARY

A computer system architecture for implementing a hacking-resistant computing device is disclosed. The computer system architecture prevents malicious computer executable code received from the Internet from accessing or affecting critical data files by hardware limiting the direct access of the critical data files to the Internet, and hardware segmenting the memory address of critical data files, files received from the Internet, and computer executable code. The computing device, which could be a mainframe computer, personal computer, smartphone, or any other computing device suitable for network communication, comprises a first partition and a second partition. The second partition can communicate over a network, such as the Internet. In contrast, the first partition can communicate either directly with the second partition through a bus, or with input/output devices directly connected to the first partition. As a result, the first partition is hardware restricted from connecting to the Internet and any other device, such as a server, which is connected to the Internet. All access to the Internet by the first partition is limited to the hardware connection between the first partition and the second partition, which in turn can connect to the Internet.

Further, the first partition includes hardware circuitry utilizing an operating system to segment the memory addresses of the first partition into three sections: computer executable code; critical data files stored on the first partition; and data files read from the second partition through a bus. This approach can also be effected by the use of three separate memory units in the first partition. In order to protect the critical data files, the second partition is hardware-limited from reading from or writing to the memory addressing of the first partition. Data from the second partition is transferred to the first partition through a "pull" command executed by the operating system of the first partition. Further, the second partition cannot "push" data to the first partition or control the first partition to send a "pull" command. All data pulled by the first partition from the second partition, by hardware design, is stored in the memory section of the first partition which is specifically for data files read from the second partition. Further, the first partition, by hardware limitation, prevents data files read from the second partition from being executed. As a result, the critical programs and critical data files stored on the first partition are protected from malicious code from the Internet or from any other source affecting the second partition.

BRIEF DESCRIPTION OF THE DRAWINGS

The detailed description makes reference to the accompanying figures wherein.

Other objects, features, and characteristics of the present invention, as well as methods of operation and functions of the related elements of the structure and the combination of parts, will become more apparent upon consideration of the following detailed description with reference to the accompanying drawings, all of which form part of this specification.

DETAILED DESCRIPTION OF THE PREFERRED EMBODIMENT

A detailed illustrative embodiment of the present invention is disclosed herein. However, techniques, methods, processes, systems, and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, electronic or otherwise, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the Detailed Description of the Preferred Embodiment using the singular or plural number may also include the plural or singular number respectively. The word "or," in reference to a list of two or more items, covers all of the following interpretations of the word: any of the items in the list, all of the items in the list, and any combination of the items in the list. The following presents a detailed description of the preferred embodiment of the present invention with reference to the figures.

Figure 1:
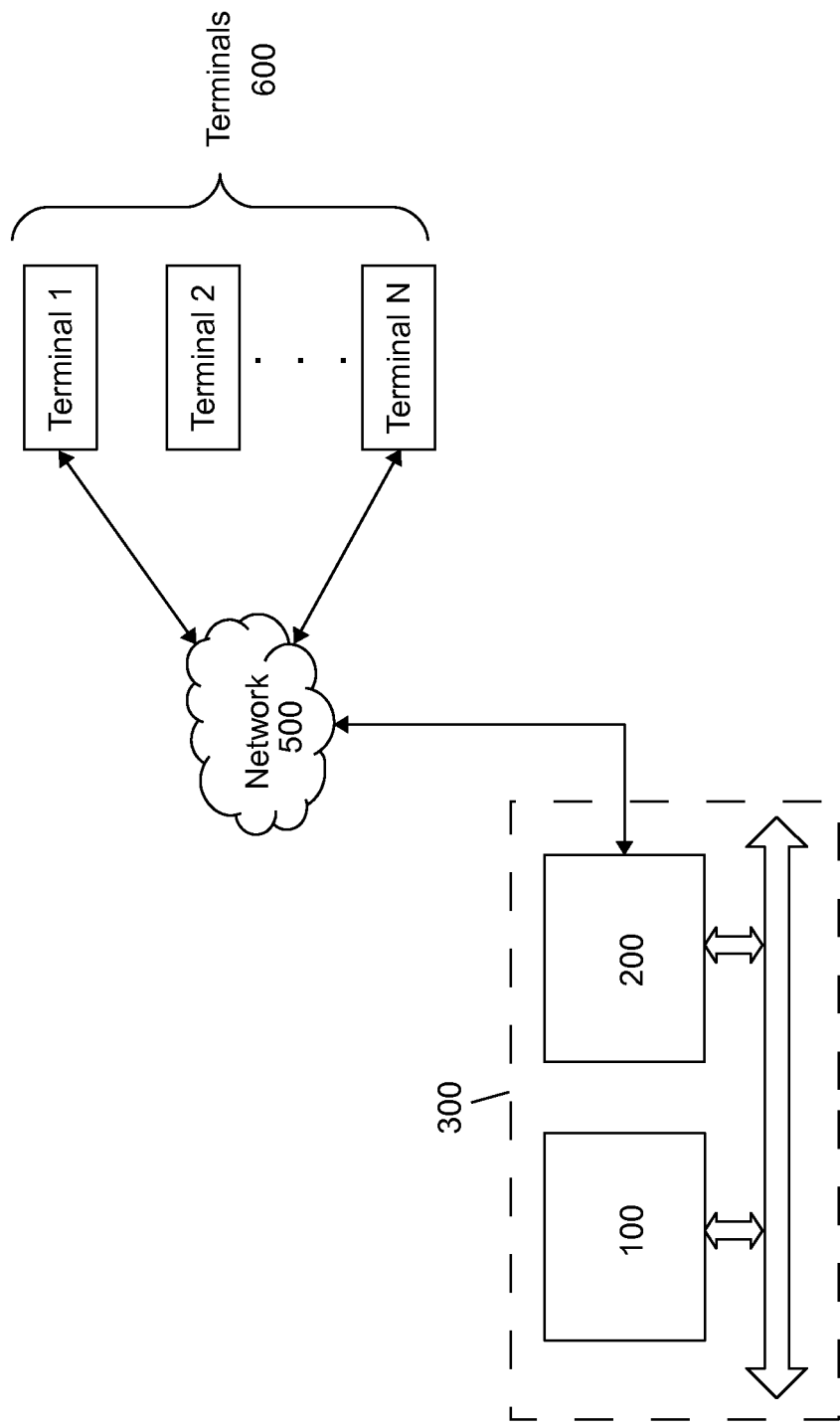
FIG. 1 illustrates an exemplary network diagram.

Referring initially to FIG. 1, shown is an exemplary network diagram of a hacking-resistant computing device. Computing device 300 can comprise any large-scale commercial or government computer or "mainframe," a set of linked computers operating in tandem, a single personal computer (PC) or mobile communication device including, but not limited to, a mobile telephone, cellular telephone, smart telephone, laptop computer, netbook, personal digital assistant (PDA), appliance, home or commercial building controller, or any other computing device suitable for network communication. Computing device 300 comprises first partition 100 and second partition 200. First partition 100 is directly interconnected to input/output devices, such as keyboards, data-storage drives, printers, and the like. In an embodiment for large-scale use, the first partition can be connected by direct hard wire to smaller computers or PCs, which are in a physical location under the control of the user of the computing device. In this embodiment, the user can disable the smaller computers or PCs from any form of Internet connection, including wire, cable, or Wi-Fi. Second partition 200 communicates over network 500 with terminals 600. As described in detail below with reference to FIG. 2, first partition 100 can communicate directly with second partition 200 using a bus, but first partition 100 is hardware restricted from communicating with network 500. In the preferred embodiment, the CPU of the first partition can directly access the memory of the second partition and the CPU of the second partition, but the CPU of the second partition is hardware-restricted from accessing the memory of the first partition and the CPU of the first partition.

Network 500 can be a local area network (LAN), a wide area network (WAN), the Internet, cellular networks, satellite networks, a combination thereof, or any other network that permits the transfer and/or reception of data to and/or from computing device 300. The data transmitted to or from computing device 300 to terminals 600 through network 500 can be transmitted and/or received utilizing standard telecommunications protocol or standard networking protocol. In the preferred embodiment, the system utilizes Transmission Control Protocol/Internet Protocol (TCP/IP) and network 500 is the Internet and/or an intranet. Other examples of protocols for transmitting and/or receiving data include but are not limited to Voice Over IP (VOIP) protocol, Short Message Service (SMS), Bluetooth wireless transmission, and Global System for Mobile Communications (GSM). Network 500 is capable of utilizing one or more protocols of computing device 300 and terminals 600. Furthermore, network 500 can translate to or from other protocols to one or more protocols of terminals 600. In some circumstances, secondary partition 200 is exposed to malicious computer executable code that is attempting to access or affect the critical data files stored on computing device 300. As described below with reference to FIGS. 2 and 3, the preferred embodiment prevents such malware from accessing or affecting the critical data files and memory of first partition 100.

Figure 2:
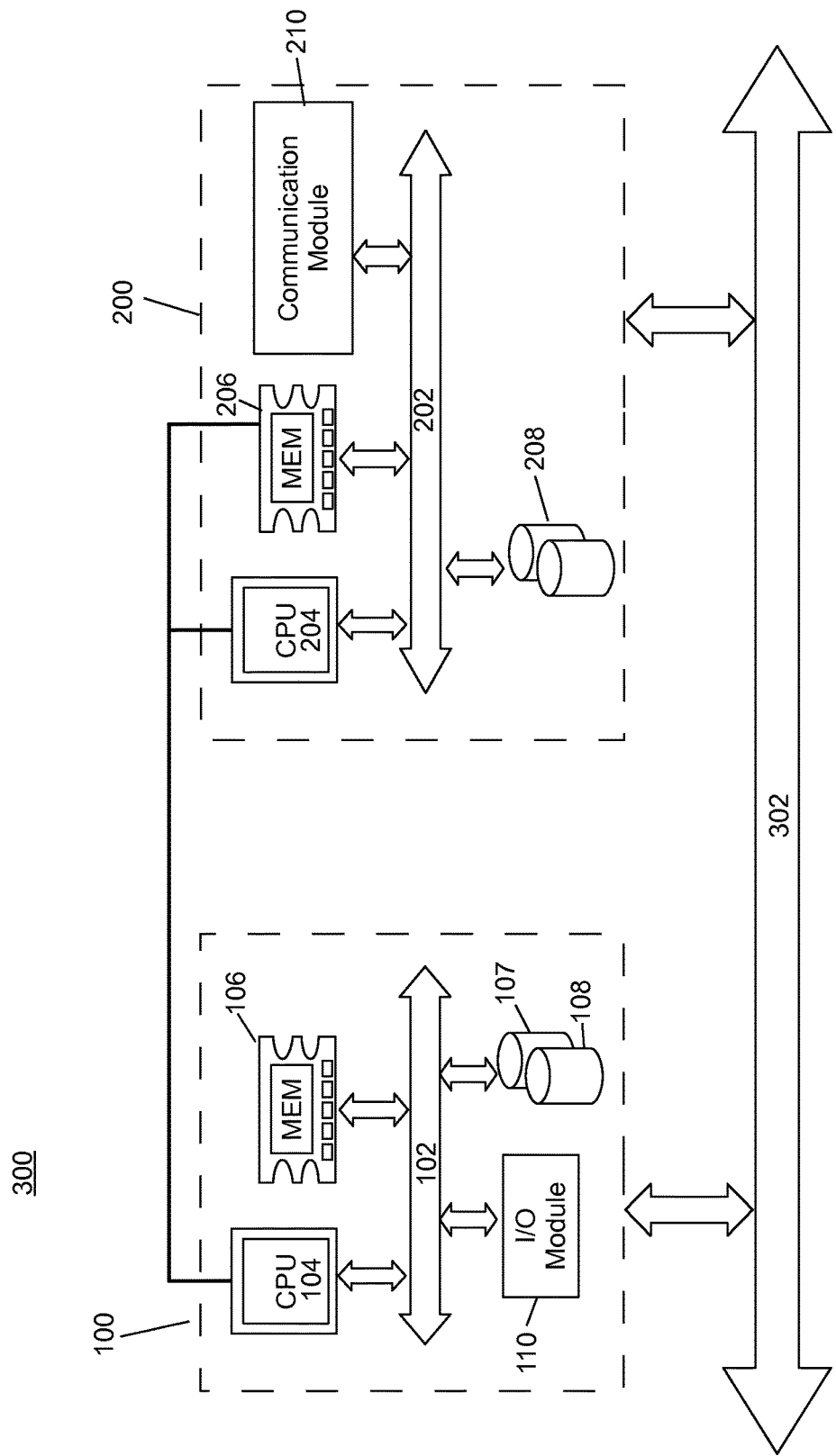
FIG. 2 is a block diagram depicting a computer system architecture for implementing the hacking-resistant computing device in accordance with various embodiments of the present invention.

Referring now to FIG. 2, shown is a block diagram depicting a computer system architecture for implementing a computing device 300 that is hardware-protected from infection with malicious computer executable code from the Internet and from any other source that can communicate through network 500. Computing device 300 comprises first partition 100. First partition 100 comprises a computer processing unit (CPU) 104 that is interconnected to first partition bus 102. First partition memory 106 is interconnected to CPU 104 through first partition bus 102. As described above with reference to FIG. 1, first partition 100 is interconnected to one or more input/output devices through input/output module 110. In the preferred embodiment, partition 100 further comprises data store 107 and 108. Critical data files are stored on memory 106 and/or data store 107. Data store 108 is used by the first partition for storing other data, including data that it has processed from second partition 200. First partition 100 includes an operating system for executing computer executable code. As described in detail below with reference to FIG. 3, CPU 104 can execute only computer executable code stored on the program code address range of memory 106, and data store 107 and 108. This is accomplished through control by the operating system of CPU 104 (which itself is protected by this embodiment against malware) and by hardware circuitry. A fundamental weakness of current computer system architectures is that execution control is often turned over to malicious computer executable code that has reached the computer through the Internet. The present embodiment limits any execution of malicious computer executable code downloaded from the Internet to the second partition.

Computing device 300 further comprises second partition 200. Second partition 200 comprises a CPU 204 that is interconnected to second partition bus 202. At least one memory 206 is interconnected to CPU 204 through second partition bus 202. Communication Module 210 allows second partition 200 to communicate through a network to terminals. The computer system architecture further includes at least one data store 208. Data store 208 is intended for the storage of data files that are not deemed critical. Second partition 200 includes an operating system for executing computer executable code. As described in detail below with reference to FIG. 3, CPU 204 can execute computer executable code from the full address range of memory 206 and data store 208.

As shown in FIG. 2, first partition 100 is directly interconnected to second partition 200 through bus 302. In addition, in the preferred embodiment, CPU 104 can write to the full address range of memory 206 and data store 208 of secondary partition 200. One advantage of this design is the ability of first partition 100 to restore the operating system and data files of second partition 200 that have been affected by malicious computer executable code. In addition, CPU 104 can read data from the full address range of memory 206 and data store 208, but only by a "read" command (pull) by CPU 104. CPU 104 cannot, by hardware limitation, accept any data or other files pushed to it by second partition 200. In addition, second partition 200 cannot pull any data from first partition 100. Further, the operating system and supporting programs of first partition 100 define the formats and other file characteristics of data that CPU 104 will accept from second partition 200. Any attempt by second partition 200 to provide files to first partition 100 that are not in the proper expected form will be rejected by CPU 104. As described in detail below with reference to FIG. 3, all data files read by CPU 104 from secondary partition 200 are written to the second partition address range of memory 106 and/or data store 108. First partition 100 is protected from any malicious computer executable stored on secondary partition 200, because CPU 104 can execute only computer executable code stored on the program code address range of memory 106 and data store 107.

The computer system architecture described in FIG. 2 can be applied to various computing devices, including but not limited to large mainframe computers, personal computers, pads, tablets, and smart phones. Further, the computer system architecture can be applied to new products or adapted to existing computer designs. Although the computer architecture described in FIG. 2 is disclosed as a single set of chips, the techniques may be applied to a system with two separate computer systems, provided the computer systems are designed in accordance with the principles disclosed herein. In an embodiment with two separate computer systems, the first computer system (with a role similar to that of the first partition) would store the critical data files that are protected from malicious code, while the second computer system (with a role similar to that of the second partition) communicates with remote terminals. Further, the first computer system would be directly connected to the second computer system.

Figure 3:
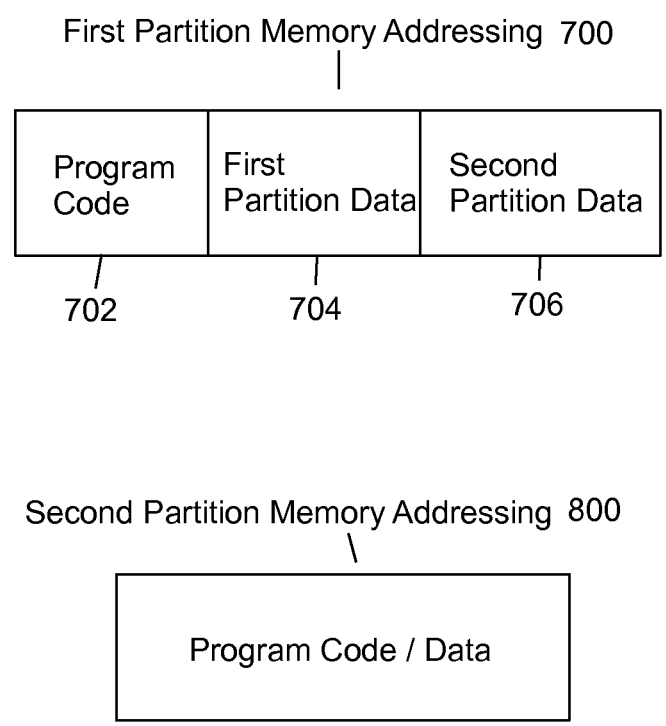
FIG. 3 depicts the memory addressing of the computing device in accordance with the preferred embodiment.

Turning next to FIG. 3, shown is the memory addressing of the first partition and the second partition. First partition memory addressing 700 (in memory 106 shown in FIG. 2) comprises at least one program code address block 702, at least one first partition data address block 704, and at least one second partition data address block 706. In the preferred embodiment, the writing and reading of data for each address block of first partition memory addressing 700 is restricted by designing the CPU of the first partition to physically limit the usable memory addressing space. For example, a CPU that supports 32-bit or 64-bit addressing can limit the access of the operating system for executing computer executable code to the bits mapped to the program code address. As a result, malicious computer executable code located on first partition data address block 704 and second partition data address block 706 is not executed by the operating system, even if some of such data files may be flagged as valid computer executable code. Further, the CPU of the first partition writes any data read from the second partition only to second partition data address block 706, which cannot be used for execution. This design prevents malicious computer executable code in the second partition from being written to program code address block 702 of first partition memory addressing 700. A further advantage of a hardwired design is that the address range of the write and read commands cannot be affected by malicious computer executable code, because the CPU of the first partition would need to be physically changed to affect the memory address ranges. It would be apparent to one skilled in the art that it would also be possible to utilize three separate memories for separating the addressing of the first partition.

Yet another degree of hardware protection can be implemented for the programs in program code address block 702. This can include highly critical data files that are infrequently updated, and associated with programs in program code address block 702. Access to update the contents of program code address block 702 is limited to devices that are directly connected to first partition 100. The combination of CPU 104, bus 102 and I/O module 110 can be controlled with optional hardware switches, so that the ability to modify the contents of program code address block 702 requires switching on by an authorized personnel. As a result, any update to program code address block 702 requires both access by authorized personnel at the directly-connected devices providing the updates and the independent action by personnel authorized to turn on the switches. For highly secure systems, this design would provide an added degree of protection against even authorized, directly-connected users from improperly attempting (inadvertently or intentionally) to modify the programs or highly critical data stored in program code address block 702.

In contrast, the CPU of the second partition is limited to reading and writing to second partition memory address 800. As shown in FIG. 3, either data or program code can be read or written to the full address range of second partition memory address 800 utilizing known techniques in the art. However, the CPU of the second partition is hardware-restricted from accessing or modifying the memory address of the first partition. This design prevents the CPU of the second partition from writing to the first partition malicious computer executable code that has affected the second partition from remote terminals through the Internet. Further, the CPU of the first partition can directly access second partition memory address 800, thereby improving the read and write performance of the CPU of the first partition by avoiding delays caused by activity on the bus interconnecting the first partition and second partition. The CPU of the first partition can read from memory address 800 only into second partition data address block 706, which is specifically devoted to data read from the second partition.

Figure 4:
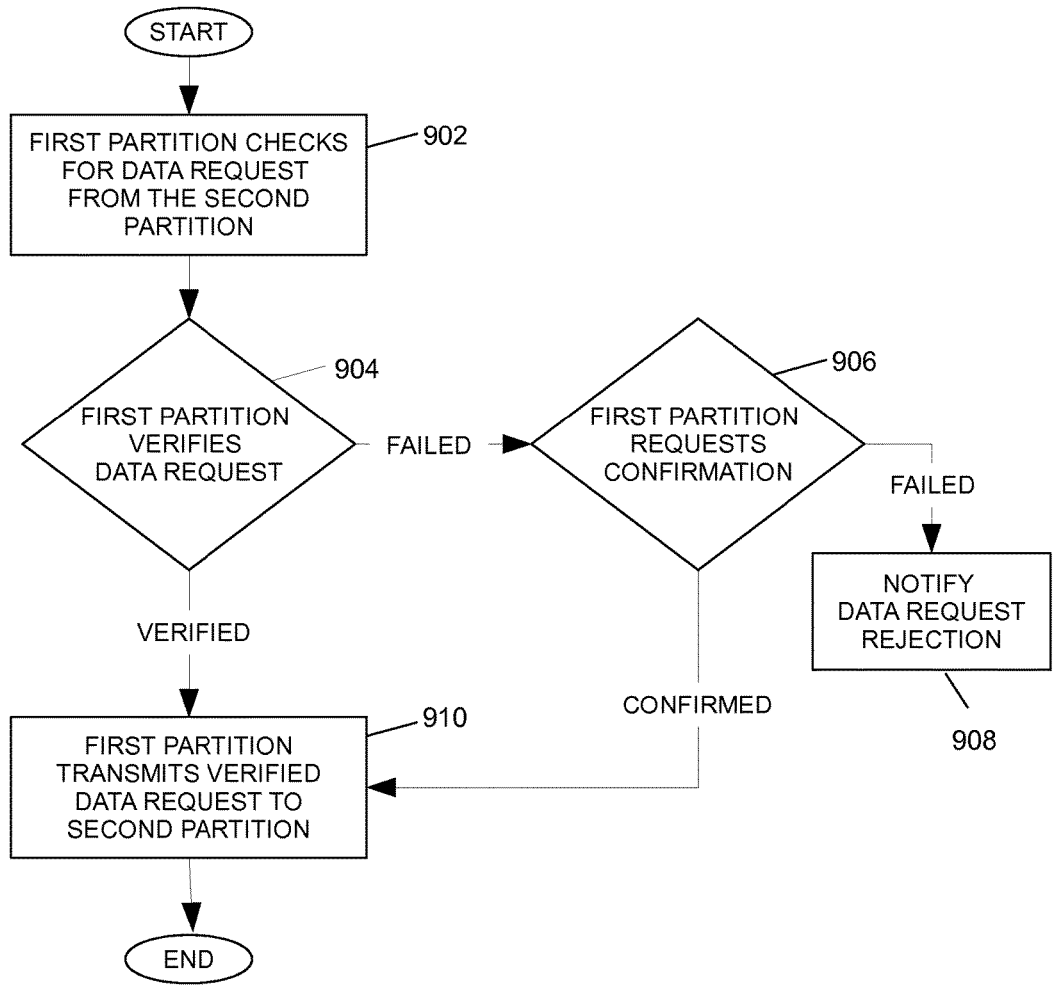
FIG. 4 is a flowchart depicting a process according to the preferred embodiment.

FIG. 4 depicts a flowchart representing the process of the second partition obtaining a data file located on the first partition. First in step 902, the CPU of the first partition periodically checks with the CPU of the second partition for a current data request. The data request can be a request to obtain items of data, update items of data, or request an action by the first partition, for example, transfer funds from one account to another, or changing the temperature setting in a building. Next, in step 904, a program resident on the first partition verifies the legitimacy of the data request. As described above, the program resident on the first partition is hardware-protected from infection by malicious computer executable code from the Internet and from any other network. The process proceeds to step 910 for a data request that is verified by the program resident on the first partition. Otherwise, the process proceeds to step 906 for a failed verification. In step 906, the CPU of the first partition can request confirmation by an authorized individual connected directly to the first partition due to any suspicious activity detected in step 904. The process proceeds to step 910 if an authorized individual connected directly to the first partition confirms the data request. Otherwise, the process proceeds to step 908. In step 908, the CPU of the first partition alerts the authorized individual that the data request has been rejected and proceeds to another data request. Following verification and/or confirmation, in step 910, the CPU of the first partition accesses the data file and provides applicable elements of data to the second partition. Under this design, the second partition cannot gain direct access to any critical data file on the first partition. As described above, the hardware of the computer system architecture disclosed in the preferred embodiment is structured so that the command to send data files from the first partition cannot be controlled by the second partition. As a result, any malicious code located on the second partition is unable to place the malicious code into the executable code of the first partition and thus access or affect any critical data files.

In addition to protecting the first partition, the present preferred embodiment can allow the first partition to restore the data files of the second partition that are affected by malicious computer executable code. Malicious computer executable code can disrupt the second partition and its control of screens and keyboards, thereby preventing users from accessing remote terminals through the second partition. In one embodiment, the first partition includes a hardware feature that utilizes a keystroke sequence to allow a user directly connected to the first partition to command the CPU of the first partition to take control of the screens and keyboards, as well as program control, of the secondary partition affected by malicious computer executable code. The authorized user directly connected to the first partition can, through the first partition, initiate protective software on the second partition. The user can also command the first partition to completely erase the memory and/or data files of the second partition to remove the malicious computer executable code, or restore the second partition to a previously saved state without such malicious code. In this embodiment, the operating system and the applications of the second partition are logged by the first partition. As a result, the first partition can restore the operating system and applications of the second partition after removing the malicious computer executable code. The second partition will be operational after the removal of the malicious code, thereby allowing access to remote terminals for the computing device.

In addition, the preferred embodiment makes it practical to introduce various types of protective software. As described above, the preferred embodiment utilizes various hardware methods to prevent malicious computer executable code from accessing and affecting the program code or data files of the first partition. Such methods include, but are not limited to, preventing the direct access of the first partition to remote terminals through the Internet and limiting the memory addressing of the first partition. Although this design limits the request for data files of the first partition from the secondary partition, other aspects of the computing device will operate as a normal computer system known in the art. For example, as the CPU of the first partition reads data from the second partition, the CPU from the first partition will often receive requests for individual items of data to be sent back to the secondary partition. This requested information can then be forwarded by the second partition to a remote terminal over a network. The preferred embodiment permits protective programs to be executed by the CPU of the first partition to check whether such data requests are suspicious, either individually or in aggregate over a period of time. An exemplary suspicious data request is a program on the second partition requesting critical data files mapped by the software on the first partition to financial information. As a result, the CPU of the first partition can initiate appropriate means of verification when suspicious activity is detected, including request for intervention from an authorized individual with direct connection to the first partition. In a further example, the hardware-protected program code of the first partition is programmed to send only specific items of data, rather than whole files or full sets of critical data files to the second partition. The exemplary program can also refuse to send confidential data, such as passwords and credit-card security codes to the second partition. Such programs are not practical in known systems, because malicious computer executable code can have direct access to critical data files and could alter protective programs.

The present invention may also be incorporated into the architecture of mobile devices by creating a hardware "sandbox" for applications. Like the software "sandboxing" currently in use on some cell phone operating systems, this would allow applications access to some functions and data while restricting access to other critical memory. Unlike those existing methods, this embodiment offers a hardware limitation on the access of malicious computer executable code. Critical data and the operating system itself could be protected from alteration by any application, as all supplementary programs would be loaded into the secondary partition.

In addition, the present invention can be used to protect networked devices whose primary interface is for a function other than computing. Appliances, such as refrigerators and thermostats, are increasingly designed to connect to the Internet. Such devices can also be designed with the computer system architecture of the preferred embodiment, to shield the functions of the primary partition from malicious computer executable code received over the Internet or through a network. Other "smart home" and "smart building" devices and computer-enabled consoles in vehicles may make corresponding use of the computer system architecture.

While the preferred embodiment is described in the context of an integrated new computer system architecture, the present invention can be adapted to computing devices utilizing existing architectures in conjunction with a combination of hardware and software utilizing key features of the preferred embodiment. Such embodiments may be useful for users who have invested significantly in existing computers and want to continue using them, but want improved protection against hacking. In one embodiment, the first partition of the integrated system can be connected to an existing computer, which can hold most of the critical files and programs. As a result, the computer would be isolated from the Internet and other external sources, as described above for the first partition of the integrated system. The first partition could communicate, read and write with the computer, through a bus or I/O module, and the computer would be protected by hardware and an operating system from malware.

Figure 5:
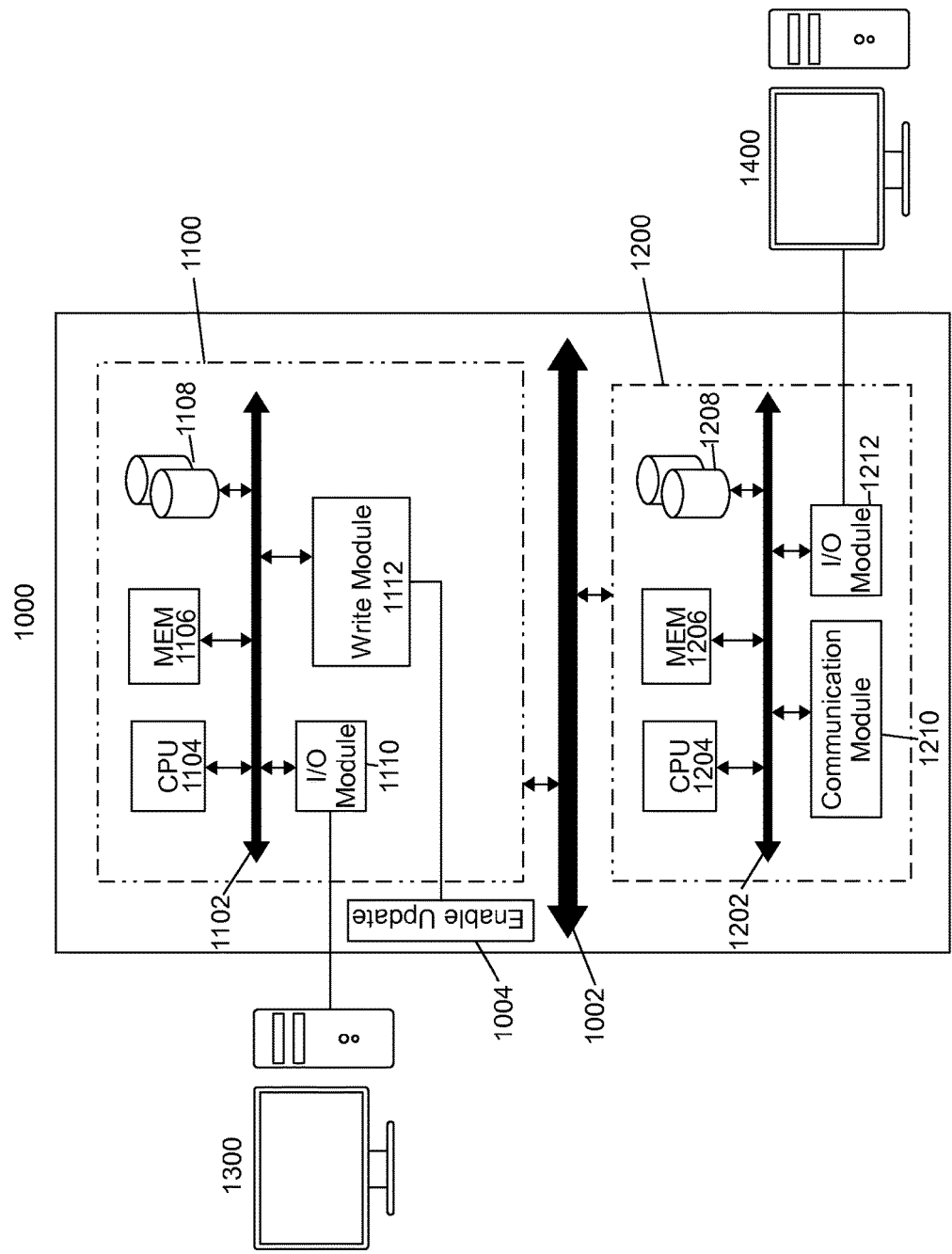
FIG. 5 is a block diagram depicting an embodiment of the present invention adapted for use with computing devices utilizing existing computer architectures.

Another alternative embodiment is illustrated in FIG. 5, comprising first computer 1300 and second computer 1400. First computer 1300 and second computer 1400 utilize known computer architectures in the art, for example, x86, ARM, and PowerPC. As such, first computer 1300 and second computer 1400 contain operating systems for executing computer executable code. As discussed above, the disadvantage of these known architectures is that the processor of first computer 1300 and second computer 1400 are susceptible to the execution of malicious computer executable code received from the Internet, which can access and affect critical data files. Further, such malicious computer executable code can circumvent known software solutions. In the present embodiment, second computer 1400 can connect to the Internet. As a result, second computer 1400 is susceptible to malicious computer executable code from the Internet. However, first computer 1300 is not connected to the Internet and is interconnected to second computer 1400 through computing device 1000. First computer 1300 could achieve some degree of protection through use of an operating system approach, as described in detail below with reference to FIG. 6. However, such protection would be limited and subject to compromise by sophisticated hackers. It will be far more protective to also employ computing device 1000, using hardware design and techniques of the present preferred embodiment, to protect first computer 1300 from any malicious computer executable code affecting second computer 1400. Computing device 1000 embodies much of the architecture of the full integrated system described above, allowing first computer 1300 to deal with data and requests received from the Internet by computer 1400, in ways that resist hacking attempts on computer 1300.

As shown in FIG. 5, computing device 1000 comprises first partition 1100 and second partition 1200. Second partition 1200 comprises CPU 1204, memory 1206, data store 1208, and I/O module 1212, which are interconnected by bus 1202. CPU 1204 executes an operating system located on data store 1208 and/or memory 1206 to communicate with second computer 1400 through I/O module 1212. I/O module 1212 can be a USB port, eSATA, WiFi, or any other known communication interfaces for connecting computing device 1000 to second computer 1400. In this embodiment, software is executing on second computer 1400, which allows CPU 1204 to receive data from second computer 1400. The data files read from second computer 1400 by CPU 1204 are stored on memory 1206 and/or data store 1208. CPU 1204 is hardware limited from directly communicating with first computer 1300. Second partition 1200, further comprises communication module 1210. Communication module 1210 allows second partition 1200 to communicate through a network, such as the Internet. As a result, communication module 1210 can be utilized by first computer 1300 to access data from the Internet, instead of utilizing second computer 1400 to access data from the Internet.

Computer 1300 and computing device 1000 are directly interconnected to input/output devices, such as keyboards, data-storage drives, printers, and the like. In an embodiment for large-scale use, computer 1300 and computing device 1000 can be connected by direct hard wire to smaller computers or PCs, which are in a physical location under the control of the user of the computing device. In this embodiment, the user can disable the smaller computers or PCs from any form of Internet connection, including wire, cable, or Wi-Fi. Computing device 1000 is hardware restricted from communicating with remote terminals over a network. Computer 1300 is preferably restricted by other means from communicating with remote terminals over a network, for example, disabling remote connections in the operating system of computer 1300.

First computer 1300 is directly connected to I/O module 1110 of first partition 1100. I/O module 1110 can be a USB port, eSATA, or any known communication interfaces for connecting computing device 1000 to first computer 1300. First partition 1100 further comprises CPU 1104, memory 1106, and at least one data store 1108, which are interconnected by bus 1102. As described in detail above with reference to FIG. 3, CPU 1104 can execute only computer executable code stored on the program code address range of memory 1106, and data store 1108. This is accomplished through control by the operating system of CPU 1104 (which itself is protected by the present embodiment against malware), by hardware circuitry.

In this embodiment, software is executing on first computer 1300, which allows CPU 1104 to send and receive data from first computer 1300. The software allows the user of first computer 1300 to segment the areas of memory for first computer 1300 into critical programs, critical data files, and data and requests received from computing device 1000. In addition, the software prevents the CPU of first computer 1300 from turning over execution control to the memory segment with files received from computing device 1000. One example of computer security for separating the memory segment from execution control is the use of a sandbox security mechanism. First partition 1100 is directly interconnected to second partition 1200 through bus 1002. CPU 1104 can write to the full address range of memory 1206 and data store 1208 of secondary partition 1200. In addition, CPU 1104 can read data from the full address range of memory 1206 and data store 1208, but only by a "read" command (pull) by CPU 1104. CPU 1104 cannot, by hardware limitation, accept any data or other files pushed to it by second partition 1200. In this embodiment, the software running on first computer 1300, which is directly connected to first partition 1100, can request CPU 1104 to pull any data from second partition 1200. First partition 1100 of computing device 1000 is protected from any malicious computer executable code stored on second computer 1400 or memory 1206, because CPU 1104 can execute only computer executable code stored on the program code address range of memory 1106 and data store 1108.

In this embodiment, first partition 1100 utilizes write module 1112 to write data to the segment of memory selected by the software running on first computer 1300 for data files received from computing device 1000. Write module 1112 comprises hardware circuitry to map the segment of memory of first computer 1300 segmented as data files received from computing device 1000. An exemplary hardware circuity includes Field Programmable Gate Arrays (FPGAs) that can be programmed by control of authorized staff connected directly to computing device 1000. In this embodiment, computing device 1000 comprises enable update switch 1004. Enable update switch 1004 includes an on position and off position. The on position of enable update switch 1004 allows programming of the hardware circuitry of write module 1112 to the segment of memory for data files received from computing device 1000. In addition, the on position of enable update switch 1004 prevents computing device 1000 from sending data to first computer 1300. In contrast, the off position of enable update switch 1004 allows computing device 1000 to send data to the software running on first computer 1300. The off position of enable update switch 1004 prevents unauthorized changes to the hardware circuitry of write module 1112. Computing device 1000 and computer 1300 can also utilize the extra protection switch and the protective software described above.

Figure 6:
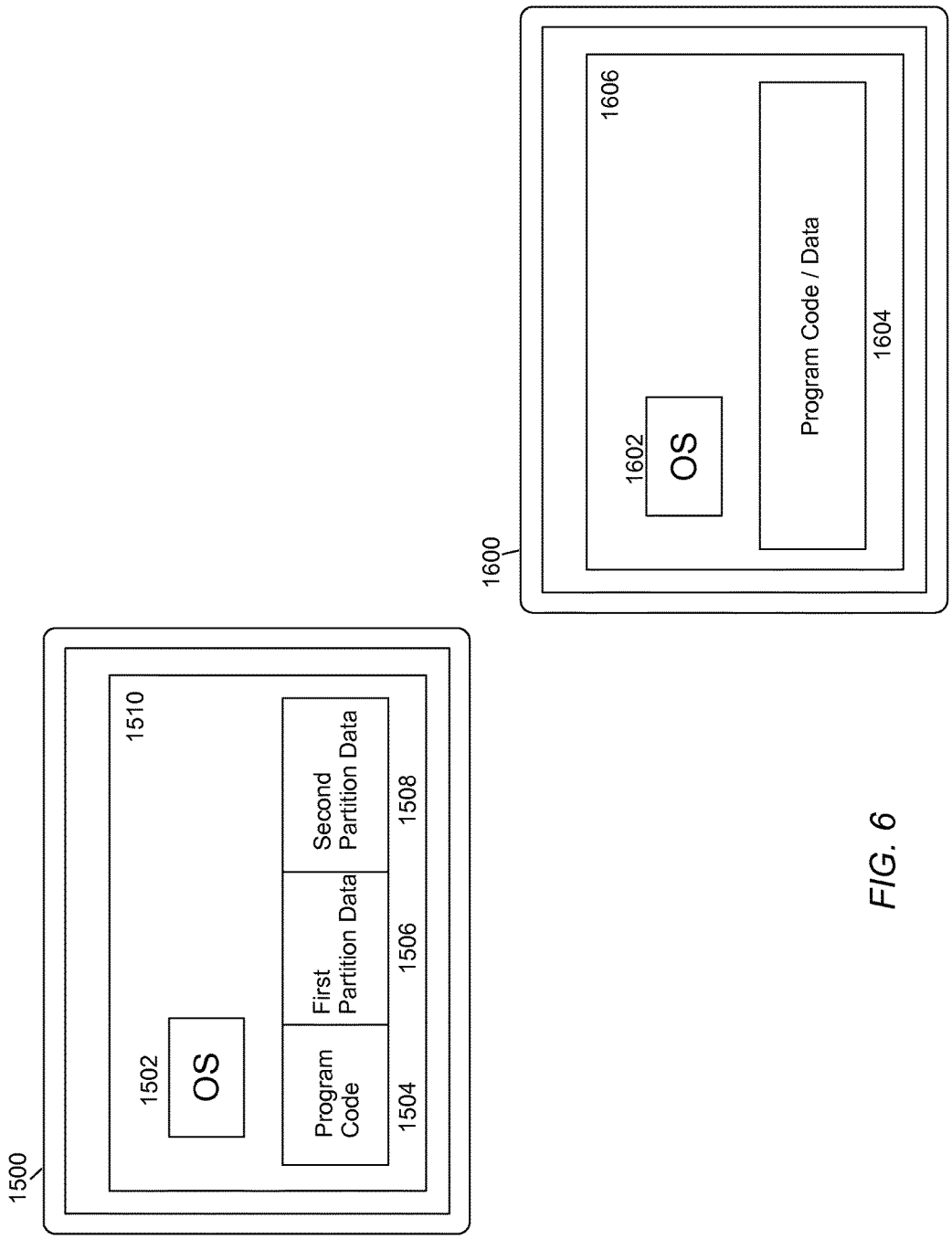
FIG. 6 is a block diagram depicting a software embodiment of the present invention adapted for use with computing devices utilizing existing computer architectures.

In yet another embodiment, FIG. 6 depicts the present invention adapted to computing devices utilizing existing architectures with a software solution. While a software solution may be susceptible to malicious executable computer code, it can provide some of the benefits of the hardware solutions described above, including restricting access to critical data files, limiting program execution access to the first computer, and avoiding giving program control to any inputs from second computer. In this embodiment, first computer 1500 is connected to second computer 1600 utilizing known communication interfaces, for example, USB, eSATA, WiFi or Ethernet. First computer 1500 and second computer 1600 utilize known computer architectures in the art, for example, x86, ARM, and PowerPC. As such, first computer 1500 and second computer 1600 contain operating systems for executing computer executable code. The critical files and systems reside on first computer 1500, while second computer 1600 is used to connect to the Internet. This design provides for the software of first computer 1500 to interact with second computer 1600 in a method that reduces the risk of hacking first computer 1500. Malware that might be received from the Internet by second computer 1600 is blocked by software executing on first computer 1500 from reaching the point of executable code on first computer 1500.

First computer 1500 comprises virtual partition 1510 created by resident software executing on first computer 1500. While virtual partition 1510 can utilize some of the computing resources (i.e. CPU and storage) of first computer 1500, virtual partition 1510 is isolated from accessing the operating system of first computer 1500, using known techniques in the art, for example software "sandboxing." As a result, virtual partition 1510 is limited from affecting the operating system of first computer 1500 in the event that virtual partition 1510 has been affected by malicious computer executable code received from virtual partition 1606 of second computer 1600. Further, virtual partition 1510 is limited to accessing data from input devices directly attached to first computer 1500 and virtual partition 1606 of second computer 1600. As a result, virtual partition 1510 is restricted from accessing computing resources of first computer 1500 that can connect to remote terminals over a network.

In this embodiment, the operating system of first computer 1500 allocates a portion of the memory of first computer 1500 to virtual partition 1510. Operating system 1502 of virtual partition 1510 is programmed to execute only program code located at program code address block 1504 of virtual partition 1500. All data received from virtual partition 1606 of second computer 1600 is stored at second partition data address block 1508. Finally, the critical data files of virtual partition 1510 are stored in first partition data address block 1506. In this design, the critical data files of first computer 1500 are protected from access by malware that may have been placed in second computer 1600. Virtual partition 1510 can request the operating system of first computer 1500 to access data files stored on first computer 1500, using the process described in detail above with reference to FIG. 4. The operating system of first computer 1500 can access the full address range of the memory allocated to virtual partition 1510. However, since any data read from second computer 1600 is stored in second partition data address block 1508 of first computer 1500, and the operating system of first computer 1500 is restricted from executing the data files stored on second partition data address block 1508, first computer 1500 will not execute any malicious executable code transferred from second computer 1600.

Second computer 1600 comprises virtual partition 1606 created by resident software executing on second computer 1600. In this embodiment, second computer 1600 is connected to remote terminals through a network. Virtual partition 1606 can utilize some of the computing resources (i.e. CPU and storage) of second computer 1600. The operating system of second computer 1600 allocates a portion of memory of second computer 1600 to virtual partition 1606. Further, the operating system of second computer 1600 allows virtual partition 1602 to access resources to communicate with remote terminals through a network. Virtual partition 1602 comprises operating system 1602, which can access and execute the full address range of program code/data address block 1604, which is allocated to virtual partition 1606 by the operating system of second computer 1600. Operating system 1502 of virtual partition 1510 is programmed to read data using a pull command from the full address range of program code/data address block 1604. However, operating system 1502 cannot, by software limitation, accept any data or other files pushed to it by virtual partition 1606 of second computer 1600. The software in second computer 1600 formats data to be read by first computer 1500 in the forms required by operating system 1502. Second computer 1600 could be infiltrated by Internet hackers. If malware alters the format of data to be provided for first computer 1500, then operating system 1502 will not accept the improperly formatted data. In addition, the software can utilize the process described above in detail with reference to FIG. 4, for the first computer to obtain data from the second computer.

Although the embodiment disclosed in FIG. 6 utilizes virtual environments to protect the programs and data of the first computer from malicious computer executable code, the techniques disclosed (i.e. software limiting access to critical data files, limiting program execution access to the first computer, and avoiding giving program control to any inputs from second computer) may be applied directly to the operating systems of the first and second computers without the use of virtual environments. In any case, such embodiments can reduce the risk of hacking, but cannot provide the increased protection afforded by the full integrated system in the preferred embodiment, which can utilize hardware as well as software protections.

While the present invention has been described primarily with reference to the preferred embodiment, which has been set forth in considerable detail for the purposes of making a complete disclosure of the invention, the preferred embodiment and other embodiments discussed are merely exemplary and are not intended to be limiting or represent an exhaustive enumeration of all aspects of the invention. Further, it will be apparent to those of skill in the art that numerous changes may be made in such details without departing from the spirit and the principles of the invention. It should be appreciated that the present invention is capable of being embodied in other forms without departing from its essential characteristics.

What is claimed:
1. A computer system comprising:
 a first partition comprising:
  a first CPU,
  at least one memory module,
  at least one write module,
  at least one I/O module,
  at least one data store comprising at least one data file, and
  a memory addressing structure, comprising:
   at least one program code address range,
   at least one first partition data address range, and
   at least one second partition data address range;
  at least one critical data file;
  computer executable code stored in the program code address range, wherein the computer executable code comprises an operating system;
  wherein the first CPU is configured to execute only the computer executable code stored in the program code address range;
  wherein the computer executable code is hardware protected by hardware switch;
 a bus, and
 a second partition comprising:
  a second CPU,
  at least one data store comprising at least one data file, and
  a communication module coupled to a network;
 wherein the first partition is interconnected to the second partition through the bus;
 wherein the first partition is configured to execute a pull command to read data from the second partition and write the data to the at least one second partition data address range of the first partition;
 wherein the first partition is configured to execute a push command to write data to the second partition;

wherein the first partition, with hardware protected computer executable code, cannot accept a push command from the second partition or a pull command from the second partition; and wherein the second partition is restricted from accessing the first CPU or the at least one memory module.

2. The computer system of claim 1, wherein a plurality of input/output devices are coupled to the I/O module of the first partition.

3. The computer system of claim 1, wherein
the program code address range comprises a first memory unit;
the first partition data address range comprises a second memory unit; and
the second partition data address range comprises a third memory unit.

4. The computer system of claim 1, further comprising a chip comprising the first partition and second partition.

5. The computer system of claim 1, further comprising a first chip comprising the first partition and a second chip comprising the second partition.

6. The computer system of claim 1, wherein the hardware switch comprises at least one external physical switch comprising an on position and an off position, wherein the at least one write module cannot modify data in the program code address range of the first partition unless the external physical switch is in the on position.

7. The computer system of claim 1, wherein the at least one write module comprises a field-programmable gate array.

8. The computer system of claim 1, wherein a hardware feature, utilizing an external device connected directly to the first partition, can enable the write module to write to the second partition from the at least one data store of the first partition, the at least one program code address range, the at least one first partition data address range, or the at least one second partition data address range.

9. A computer system comprising:
at least one partition computer comprising:
a first partition comprising:
at least one CPU,
at least one memory module,
at least one write module,
at least one I/O module,
at least one data store, and
a memory addressing structure, comprising:
at least one program code address range,
at least one first partition data address range, and
at least one second partition data address range;
computer executable code stored in the program code address range wherein the computer executable code is hardware protected by hardware switch;
wherein the at least one CPU of the first partition is configured to execute only the computer executable code stored in the program code address range;
a bus; and
a second partition comprising:
at least one CPU,
at least one memory module,
at least one data store comprising at least one data file, and
a communication module communicatively coupled to an external network; and
wherein the first partition is interconnected to the second partition through the bus;

wherein the first partition is configured to execute a pull command to read data from the second partition and write the data to the at least one second partition data address range of the first partition;
wherein the first partition is configured to execute a push command to write data to the second partition;
wherein the first partition, with hardware protected computer executable code, cannot accept a push command from the second partition or a pull command from the second partition;
wherein the second partition restricted from accessing the first CPU or the at least one memory module;
at least one separate computer communicatively coupled to the at least one I/O module;
wherein the at least one separate computer is not communicatively coupled to an external network;
wherein the at least one separate computer comprises at least one critical data file and at least one data segment;
wherein the at least one write module is configured to read from or write to the at least one separate computer;
wherein the second partition cannot read from or write to the at least one separate computer; and
wherein the at least one separate computer cannot read from or write to the second partition.

10. The computer system of claim 9, wherein the at least one write module comprises a field-programmable gate array.

11. The computer system of claim 9, wherein the at least one program code address range comprises a first memory unit, wherein the at least one first partition data address range comprises a second memory unit, and wherein the at least one second partition data address range comprises a third memory unit.

12. The computer system of claim 9, further comprising:
a second separate computer communicatively coupled to an external network; and
wherein the second partition comprises an I/O module;
wherein the second separate computer is coupled to the I/O module of the second partition;
wherein the second separate computer is not directly coupled to the first partition;
wherein the second separate computer does not hold critical files; and
wherein the second separate computer can write to and read from the second partition.

13. The computer system of claim 9, wherein a plurality of input/output devices are coupled to the I/O module of the first partition.

14. The computer system of claim 9, further comprising a chip comprising the first partition and second partition.

15. The computer system of claim 9, further comprising a first chip comprising the first partition and a second chip comprising the second partition.

16. The computer system of claim 9, wherein the physical switch comprises at least one external physical switch comprising an on position and an off position, wherein the at least one write module cannot modify data in the program code address range of the first partition unless the external physical switch is in the on position.

17. The computer system of claim 9, wherein a hardware feature,
utilizing an external device connected directly to the first partition, can enable the write module is configured to write to the second partition from the at least one data store of the first partition, the at least one program code address range, the at least one first partition data address range, or the at least one second partition data address range.

18. The computer system of claim 12, wherein the at least one program code address range comprises a first memory unit, wherein the at least one first partition data address range comprises a second memory unit, and wherein the at least one second partition data address range comprises a third memory unit.

19. The computer system of claim 12, wherein the physical switch comprises at least one external physical switch comprising an on position and an off position, wherein the at least one write module cannot modify data in the program code address range of the first partition unless the external physical switch is in the on position.

20. The computer system of claim 12, wherein a hardware feature, utilizing an external device connected directly to the first partition, can enable the write module to write to the second partition from the at least one data store of the first partition, the at least one program code address range, the at least one first partition data address range, or the at least one second partition data address range.

* * * * *